(12) United States Patent
Antonini et al.

(10) Patent No.: US 6,739,595 B1
(45) Date of Patent: May 25, 2004

(54) SELF-ENERGIZING COMBUSTION SEAL FLANGE

(75) Inventors: Joe Antonini, Chicago, IL (US); Muguru Srikantiah Shankar, Pune (IN); Subhash Hari Wani, Pune (IN)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 10/186,984

(22) Filed: Jul. 1, 2002

(51) Int. Cl.⁷ .................................................. F02F 11/00
(52) U.S. Cl. ..................... 277/591; 277/592; 277/595; 277/600; 277/601
(58) Field of Search ................. 277/591, 592, 277/594, 595, 600, 601

(56) References Cited

U.S. PATENT DOCUMENTS

| | | | |
|---|---|---|---|
| 1,779,616 A | * 10/1930 | Oven | 277/601 |
| 1,823,284 A | 9/1931 | Oven | |
| 3,924,863 A | 12/1975 | Nakano et al. | 277/235 |
| 4,776,602 A | 10/1988 | Gallo | 277/233 |
| 5,921,558 A | 7/1999 | Kozerski | 277/593 |
| 6,315,303 B1 | * 11/2001 | Erb et al. | 277/593 |

\* cited by examiner

Primary Examiner—Lloyd A. Gall
Assistant Examiner—E Peavey
(74) Attorney, Agent, or Firm—Rader, Fishman & Grauer, PLLC

(57) ABSTRACT

An improved combustion gasket is disclosed incorporating a self-energizing combustion seal flange. The flange includes at least one valley that serves to redistribute combustion explosion forces acted upon the gasket during operation of the engine to provide improved combustion sealing and to extend flange life.

20 Claims, 3 Drawing Sheets

SELF-ENERGIZING COMBUSTION SEAL FLANGE

FIELD OF THE INVENTION

The present invention relates to a cylinder head gasket for an internal combustion engine. More particularly, the invention relates to cylinder head gasket having a self-energizing combustion seal flange.

BACKGROUND OF THE INVENTION

Gaskets 10 are often used to provide a seal between an engine block 12 and a cylinder head 14 of an internal combustion engine. As shown in FIGS. 1–3, known cylinder head gaskets 10 typically include a flange 16 that extends around the periphery 18 of cylinder bores formed in the gasket 10 to provide a combustion seal for maintaining the high temperature gases of combustion within the cylinder bores. A typical combustion flange 16 has a generally semicircular cross-sectional shape with the outmost portion 20 of the flange 16 extending away from the periphery 18 and into the combustion bore.

Referring to FIGS. 1 and 2, during operation of the engine, combustion explosion forces (represented by arrows A) act upon the flange 16. As can be seen in FIG. 3, the combustion forces $A_C$ try to pass between the overlap of the flange 16 and the cylinder head 14 and heel of the flange 16 and the engine block 12. The tangential forces $A_T$ acting on the flange 16 pushes ends 22 of the flange 16 downward and way from the engine block 12 and cylinder head 14, thereby reducing sealing and promoting combustion leaks between the flange 16 and the hardware 12 and 14. Accordingly, more durable combustion seals are required to reduce the opportunity for combustion leaks and increase flange life.

SUMMARY OF THE INVENTION

The present invention provides a gasket having a core and a self-energizing seal flange. The core includes at least one gasket plate, wherein the plate has at least first apertures for mating with cylinder bores of an engine block.

In accordance with the invention, the self-energizing seal flange has a generally convex center face that directly addresses a flame front of a combustion bore opening in an otherwise generally concave combustion flange cross-sectional profile. Such a design produces a generally flatter medial profile or face to address the flame front of the combustion zone, thereby minimizing deleterious tangential forces that operate to create gasket leaks and to shorten the life of the flange.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF PREFERRED EMBODIMENTS

Figure 1:
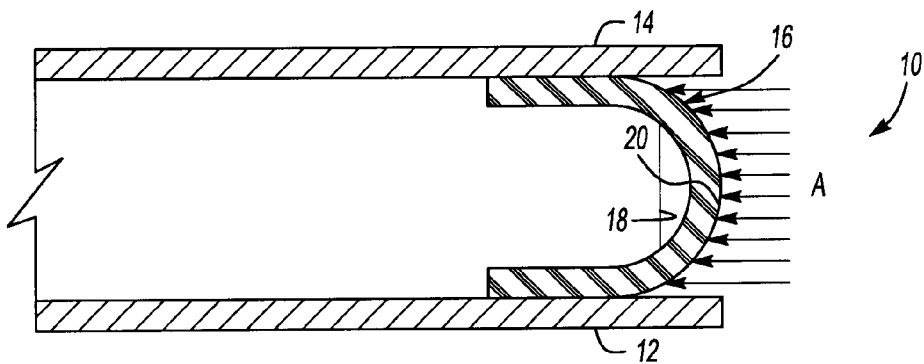
FIGS. 1–3 are cross-sectional views of a prior art gasket.
Figure 2:
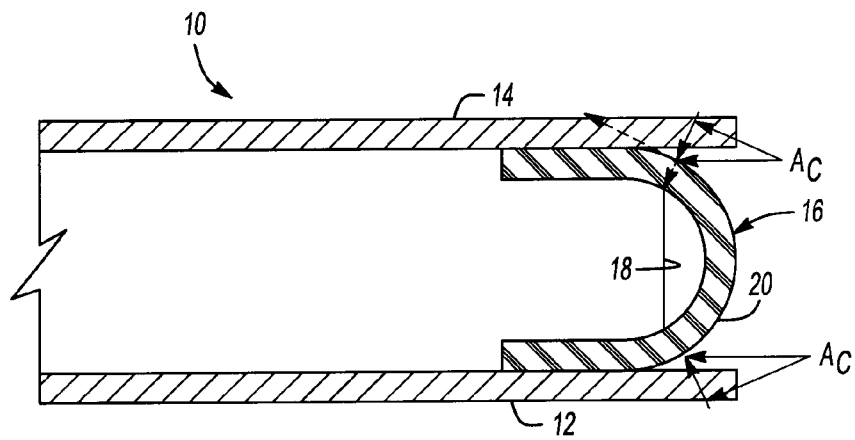
Figure 3:
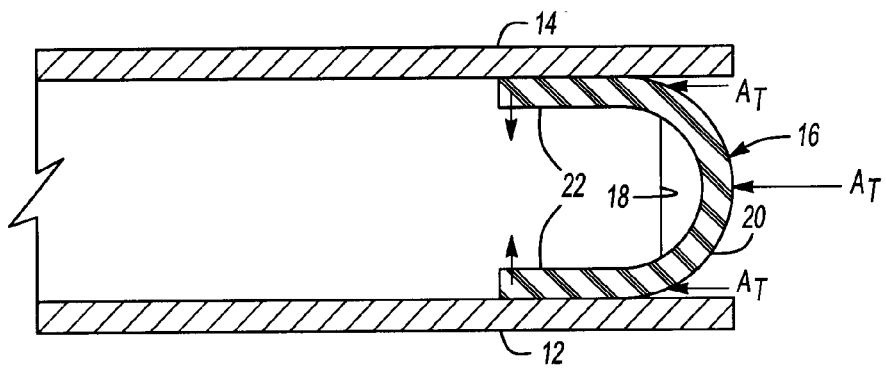
Figure 4:
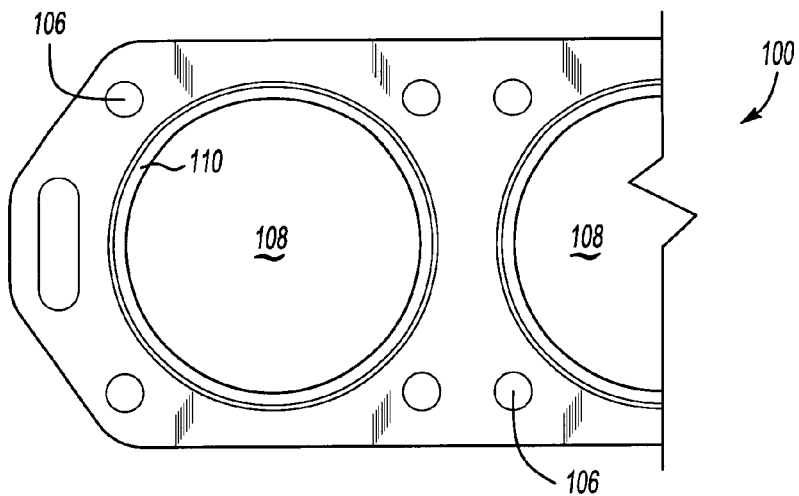
FIG. 4 is a partial planar view of a gasket in accordance with the present invention.

FIGS. 4–7 illustrate a gasket 100 that is adapted to be positioned between an engine block 102 and a cylinder head 104 of a combustion engine. Gasket 100 has a plurality of bolt holes 106 and first apertures 108 that are adapted to mate with cylinder bores of engine block 102. Gasket 100 may also provided with second apertures (not shown) that serve as fluid flow openings for engine coolant and the like. Gasket 100 is constructed so as to provide at least one combustion seal around the periphery 110 of each first aperture 108.

Figure 5:
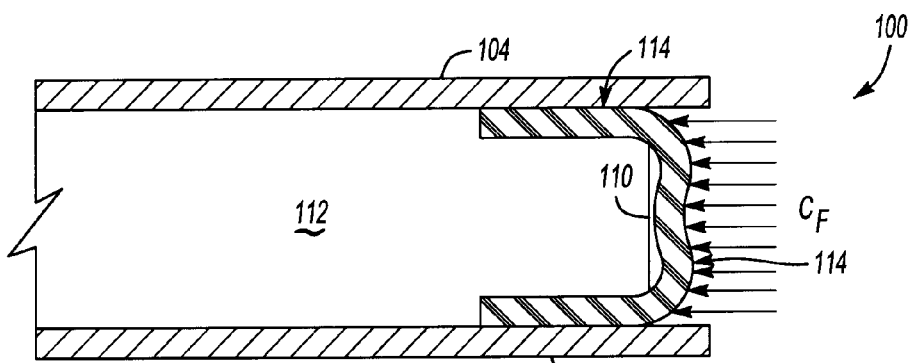
FIG. 5 is a cross-sectional view of an embodiment of the present invention positioned between mating components taken along line 5—5 of FIG. 4 shown with combustion explosion forces acting upon a combustion seal flange.
Figure 6:
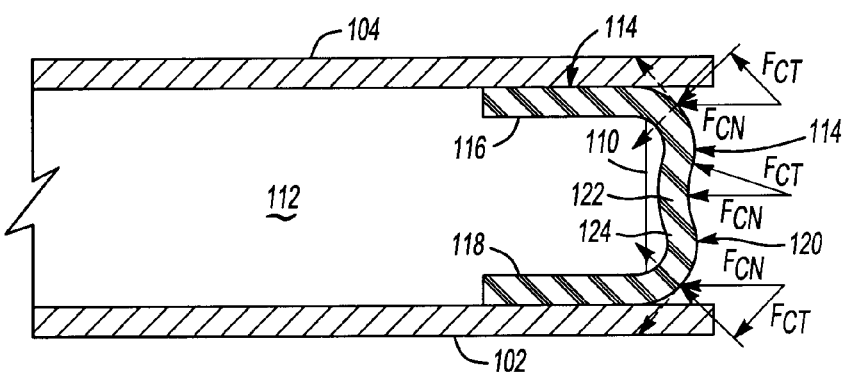
FIG. 6 is a cross-sectional view of the embodiment of FIG. 5 with the combustion explosion forces broken down into its respective tangential and normal components.
Figure 7:
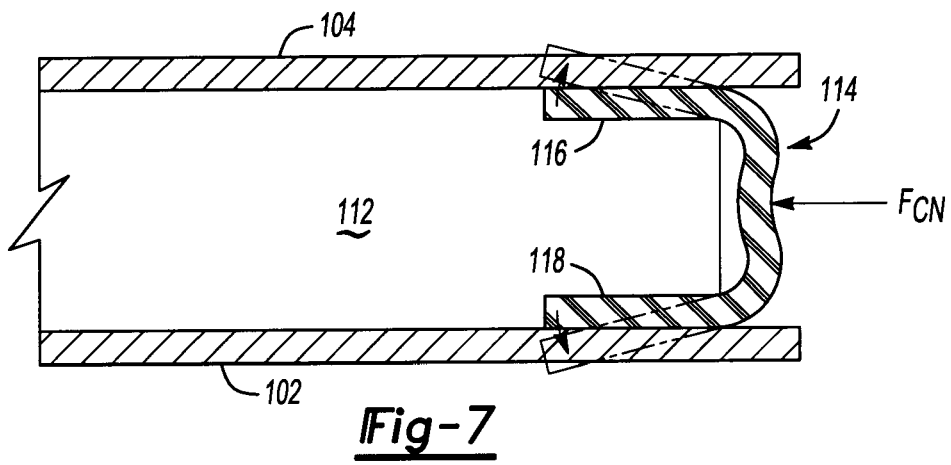
FIG. 7 is another cross-sectional view of the embodiment of FIG. 5 illustrating the effect of normal forces exerted on the combustion seal flange.

Referring to FIGS. 5–7, gasket 100 includes a core 112 that has at least one gasket plate and a combustion seal flange 114. Core 110 may be constructed of any suitable material, but is preferably constructed of metal. Combustion seal flange 114 is preferable constructed of metal to resist the high temperatures of combustion gases passing through combustion bores 108.

In accordance with one aspect of the invention, flange 114 includes a head leg 116 and a block leg 118. Head leg 116 and block leg 118 are connected together by a bridge segment 120 that extends around periphery 110 of combustion bore opening 108. Bridge segment 120 has a generally concave cross-sectional profile face. However, unlike known gasket flanges, bridge segment 120 further includes at least one slightly inwardly extending portion that forms a shallow and generally convex-shaped valley 122 between adjacent peaks 124 or a generally flatter profile face than the rounded profile faces of the prior art.

Figure 8:
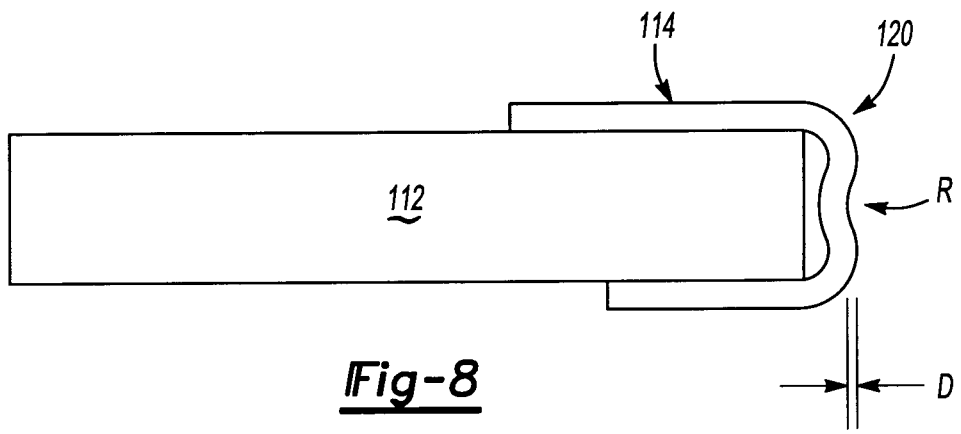
FIG. 8 is a cross-sectional view of the embodiment of FIG. 5 in an unloaded condition.

In the preferred embodiment, bridge segment 120 includes only one valley 122. It is also preferred that valley 122 is positioned at approximately the center of bridge segment 120. Referring to FIG. 8, in one preferred embodiment, valley 122 has a radius R in the range of about 0.40–0.80 inches and the distance D from an outermost profile face 126 of peaks 124 to the outermost profile face 128 of valley 122 is within the range of about 0.000–0.010 inches.

Referring to FIGS. 5–7, the operation of gasket 100 will be explained in greater detail. As can be seen in FIG. 5, during operation of a combustion engine, combustion explosion forces $C_F$ act upon the outer profile face 130 of flange 114. The combustion explosion forces $C_F$, are shown broken down into their respective tangential components $F_{CT}$ and normal components $F_{CN}$ in FIG. 6. Due to the inclusion of valley 122, most of the combustion forces $C_F$ are transferred into valley 122, rather than the corners formed between the cylinder head 104 and flange 114 and the engine block 102 and flange 114.

Referring to FIG. 7, in accordance with the invention, the normal force component $F_{CN}$ acts perpendicularly to the outer profile face 130 of flange 114, causing head and block legs 116, 118 to push against cylinder head 104 and engine block 102, respectively. Thus, the normal force component $F_{CN}$ contributes to increase the pressure of flange 114 against head and block legs 116, 118 to reduce the opportunity for combustion leaks, and to increase flange life.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A combustion seal flange, comprising:
   a first flange leg;
   a second flange leg;
   a bridge portion connecting said first and second flange legs such that said legs and said bridge portion are continuous, and said bridge portion further defines a profile face;
   wherein said bridge portion has at least one inwardly extending valley formed therein for redistributing combustion forces.

2. The combustion seal flange of claim 1, further including at least one outwardly extending peak positioned on either side of said at least one valley.

3. The combustion seal flange of claim 1, wherein said flange has a generally convex cross-section with a generally concave valley therein.

4. The combustion seal flange of claim 3, wherein said valley is positioned generally in the center of said bridge portion.

5. The combustion seal flange of claim 3, wherein said concave valley has a radius in the range of about 0.40–0.80 inches.

6. The combustion seal flange of claim 1, wherein the distance between the outermost surface of said bridge portion and the outermost surface of said valley is in the range of about 0.000–0.010 inches.

7. The combustion seal flange of claim 1, wherein combustion explosion forces acting upon an outer surface of said flange are redistributed to said valley wherein redistributed forces push first and second legs away from one another and into contact with adjacent components to seal against combustion gases.

8. The combustion seal flange of claim 1, wherein said first and second legs are generally the same length.

9. A combustion seal flange, comprising:
   a first flange leg;
   a second flange leg;
   a bridge portion connecting said first and second flange legs such that said legs and said bridge portion are continuous, and said bridge portion further defines a generally concave profile face;
   wherein said bridge portion has at least one inwardly extending valley formed therein and positioned between adjacent peaks, said valley having a generally convex profile face;
   wherein said combustion forces are redistributed to said valley; and
   wherein said redistributed forces from said valley push first and second legs away from one another and against adjacent components to seal against combustion gases.

10. The combustion seal flange of claim 1, wherein said valley is positioned generally in the center of said bridge portion.

11. The combustion seal flange of claim 10, wherein said concave valley has a radius in the range of about 0.40–0.80 inches.

12. The combustion seal flange of claim 10, wherein the distance between the outermost surface of said bridge portion and the outermost surface of said valley is in the range of about 0.000–0.010 inches.

13. A combustion engine gasket for sealing between mating components, comprising:
   a gasket core;
   a combustion seal gasket flange, including
     a first flange leg;
     a second flange leg;
     a bridge portion connecting said first and second flange legs such that said legs and said bridge portion are continuous, and said bridge portion further defines a profile face;
     wherein said bridge portion has at least one inwardly extending valley formed therein for redistributing combustion forces.

14. The gasket of claim 13, wherein said core includes at least one gasket layer.

15. The gasket of claim 13, wherein said flange has a generally convex cross-section with a generally concave valley therein.

16. The gasket of claim 15, wherein said valley is positioned generally in the center of said bridge portion.

17. The gasket of claim 15, wherein said concave valley has a radius in the range of about 0.40–0.80 inches.

18. The gasket of claim 15, wherein the distance between the outermost surface of said bridge portion and the outermost surface of said valley is in the range of about 0.000–0.010 inches.

19. The gasket of claim 13, wherein combustion explosion forces acting upon an outer surface of said flange are redistributed to said valley wherein redistributed forces push first and second legs away from one another and into contact with adjacent components to seal against combustion gases.

20. The gasket of claim 13, wherein said first and second legs are approximately the same length.

* * * * *